United States Patent
Becken et al.

(10) Patent No.: US 12,449,692 B2
(45) Date of Patent: Oct. 21, 2025

(54) DISPLAY DEVICES AND ARTICLES WITH COLOR-MATCHED DISPLAY AND NON-DISPLAY AREAS

(71) Applicant: Corning Incorporated, Corning, NY (US)

(72) Inventors: Keith James Becken, Bath, NY (US); Byung Yun Joo, Ithaca, NY (US); Arpita Mitra, Columbus, OH (US); Maricela Trejo-Moore, Painted Post, NY (US); James Andrew West, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 747 days.

(21) Appl. No.: 17/783,674

(22) PCT Filed: Dec. 2, 2020

(86) PCT No.: PCT/US2020/062765
§ 371 (c)(1),
(2) Date: Jun. 9, 2022

(87) PCT Pub. No.: WO2021/118835
PCT Pub. Date: Jun. 17, 2021

(65) Prior Publication Data
US 2023/0032209 A1 Feb. 2, 2023

Related U.S. Application Data

(60) Provisional application No. 62/947,086, filed on Dec. 12, 2019.

(51) Int. Cl.
*F21V 8/00* (2006.01)
*B32B 17/06* (2006.01)
(Continued)

(52) U.S. Cl.
CPC ........ *G02F 1/133512* (2013.01); *B32B 17/06* (2013.01); *G02B 1/04* (2013.01);
(Continued)

(58) Field of Classification Search
None
See application file for complete search history.

(56) References Cited

U.S. PATENT DOCUMENTS 6,037,711 A * 3/2000 Cathey ............... H01J 29/085
  313/308
8,312,739 B2  11/2012 Lee et al.
(Continued)

FOREIGN PATENT DOCUMENTS

CN  102460283 A  5/2012
CN  103733244 A  4/2014
(Continued)

OTHER PUBLICATIONS

Taiwanese Patent Application No. 109143827, Office Action dated Oct. 9, 2024, 2 pages (English Translation only), Taiwanese Patent Office.
(Continued)

*Primary Examiner* — Eli D. Strah
(74) *Attorney, Agent, or Firm* — Daniel J. Greenhalgh (57) ABSTRACT

A display device that includes: a glass substrate comprising a refractive index ($n_{substrate}$); a display device structure coupled to the substrate to collectively define a viewing area; and a black mask structure surrounding the display device structure that is coupled to the substrate and comprises a black ink layer and at least one glossy layer between the black ink layer and the glass substrate. The viewing area is characterized by (a) a reflectance from 0.5% to 2.5% as measured at 8 degrees from normal in the visible spectrum, (b) a brightness in the CIE colorimetry system such that
(Continued)

$5 < L^* < 17$ for the specular component included (SCI), and (c) a brightness in the CIE colorimetry system such that $0 < L^* < 3$ for the specular component excluded (SCE). Further, the at least one glossy layer comprises a refractive index ($n_{glossy}$) such that $|n_{glossy} - n_{substrate}| > 0.1$.

20 Claims, 5 Drawing Sheets

(51) Int. Cl.
    *G02B 1/04*       (2006.01)
    *G02F 1/1335*    (2006.01)

(52) U.S. Cl.
    CPC ........ *G02B 6/0065* (2013.01); *B32B 2255/26* (2013.01); *B32B 2255/28* (2013.01); *B32B 2307/402* (2013.01); *B32B 2307/418* (2013.01); *G02B 2207/107* (2013.01)

(56) References Cited

U.S. PATENT DOCUMENTS

| | | | |
|---|---|---|---|
| 8,561,729 | B2 | 10/2013 | King et al. |
| 8,854,623 | B2 | 10/2014 | Fontaine et al. |
| 9,879,145 | B2 | 1/2018 | Ogata et al. |
| 2007/0182885 | A1 | 8/2007 | Egi et al. |
| 2011/0228401 | A1 | 9/2011 | Fukushima et al. |
| 2012/0147303 | A1 | 6/2012 | Yamada et al. |
| 2017/0336538 | A1 | 11/2017 | Hart et al. |
| 2018/0275787 | A1 | 9/2018 | Yoo et al. |

FOREIGN PATENT DOCUMENTS

| | | |
|---|---|---|
| JP | 2013-156315 A | 8/2013 |
| JP | 2013-156622 A | 8/2013 |
| JP | 2016-066079 A | 4/2016 |
| TW | 200734769 A | 9/2007 |
| WO | 2019/055458 A1 | 3/2019 |

OTHER PUBLICATIONS

Chinese Patent Application No. 202080096583.6, Office Action dated Feb. 6, 2025, 5 pages (English Translation only), Chinese Patent Office.

"Dispersion of Zirconia Nanoparticles : ZIRCOSTAR", Retrieved from: https://www.shokubai.co.jp/en/rd/materials01.html, 2 pages.

ASTM C770-16, entitled "Standard Test Method for Measurement of Glass Stress-Optical Coefficient".

ASTM E2001-13. "Standard Guide for Resonant Ultrasound Spectroscopy for Defect Detection in Both Metallic and Non-metallic Parts", 2013.

Higashihara et al., "Recent Progress in High Refractive Index Polymers", Macromolecules, vol. 48, 2015, pp. 1915-1929.

International Search Report and Written Opinion of the International Searching Authority; PCT/US20/062765; dated Mar. 4, 2021; 3 pages; US Patent Office.

Li et al., "Transparent dispensible high-refractive index ZrO2/epoxy nanocomposites for LED encapsulation", Journal on Applied Polymer Science, vol. 130, 2013, 22 pages.

Vukmirovic' et al., "Comparison of Barium titanate thin films prepared by inkjet printing and spin coating", Processing and Application of Ceramics, vol. 9, No. 3, 2015, pp. 151-156.

* cited by examiner

DISPLAY DEVICES AND ARTICLES WITH COLOR-MATCHED DISPLAY AND NON-DISPLAY AREAS

CROSS-REFERENCE TO RELATED APPLICATIONS

This application claims the benefit of priority under 35 U.S.C. § 371 of International Application No. PCT/US2020/062765, filed on Dec. 2, 2020, which claims the benefit of priority under 35 U.S.C § 119 of U.S. Provisional Application Ser. No. 62/947,086 filed on Dec. 12, 2019, the contents of which are relied upon and incorporated herein by reference in their entirety.

BACKGROUND

The disclosure relates to display devices and articles with color-matched display and non-display areas, particularly automotive interior displays with a color-matched display area and a surrounding, black mask area.

Vehicle manufacturers are developing and producing automotive interiors that safely inform passengers and drivers with improved connectivity. Many of these interior designs offer new aesthetics to appeal to consumers. Further, some of these interiors offer one or more large displays with touch functionality.

The current trend in automotive interior displays is to provide a stylish glass or glass-like substrate with optical and touch functionality. Many of these displays include anti-reflection (AR), anti-fingerprint and/or haptic coatings and features. Some of these displays include display panels or devices with multi-layer stacks or films that are laminated to a glass substrate using an optically clear resin (OCR). Further, these displays often include a black mask (BM) region that surrounds the display panel or device. These displays are usually visible to the driver and passengers when the display is turned off, an aesthetic feature that is not desirable to many drivers and passengers. The non-display region (e.g., with a BM region) surrounding the display region of the display can create a visible, color mismatch between the display region and the non-display region of the device.

Accordingly, there is a need for display devices and articles with a color-matched display and non-display area, particularly for use in automotive interior displays.

SUMMARY

According to some aspects of the disclosure, a display device is provided that includes: a glass substrate comprising a refractive index ($n_{substrate}$); a display device structure that comprises a light source and a plurality of films, the display device structure coupled to the substrate to collectively define a viewing area; and a black mask structure surrounding the display device structure, the black mask structure coupled to the substrate. The black mask structure comprises a black ink layer and at least one glossy layer between the black ink layer and the glass substrate. The viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE). Further, the at least one glossy layer comprises a refractive index ($n_{glossy}$) such that $|n_{glossy} - n_{substrate}| > 0.1$.

According to some aspects of the disclosure, a display device is provided that includes: a glass substrate comprising a refractive index ($n_{substrate}$); a display device structure that comprises a light source and a plurality of films, the display device structure coupled to the substrate to collectively define a viewing area; and a black mask structure surrounding the display device structure, the black mask structure coupled to the substrate. The black mask structure comprises a black ink layer and at least one glossy layer between the black ink layer and the glass substrate. The viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE). Further, the black mask area is characterized by (a) a reflectance from 0.5% to 2.5% as measured at 8 degrees from normal in the visible spectrum, (b) a brightness in the (L*, a*, b*) CIE colorimetry system such that 0<L*<20 for the specular included component (SCI), and (c) a brightness in the (L*, a*, b*) CIE colorimetry system such that 0<L*<3 for the specular excluded component (SCE).

According to some aspects of the disclosure, a display device is provided that includes: a glass substrate comprising a refractive index ($n_{substrate}$); a display device structure that comprises a light source and a plurality of films, the display device structure coupled to the substrate to collectively define a viewing area; and a black mask structure surrounding the display device structure, the black mask structure coupled to the substrate to collectively define a black mask area. The black mask structure comprises a black ink layer and at least one glossy layer between the black ink layer and the glass substrate. The viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE). In addition, the black mask area is characterized by (a) a reflectance from 0.5% to 2.5% as measured at 8 degrees from normal in the visible spectrum, (b) a brightness in the (L*, a*, b*) CIE colorimetry system such that 0<L*<20 for the specular included component (SCI), and (c) a brightness in the (L*, a*, b*) CIE colorimetry system such that 0<L*<3 for the specular excluded component (SCE). Further, the at least one glossy layer comprises a refractive index ($n_{glossy}$) such that $|n_{glossy} - n_{substrate}| > 0.1$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes embodiments having two or more such components, unless the context clearly indicates otherwise.

As used herein, the term "dispose" includes coating, depositing and/or forming a material onto a surface. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein.

As used herein, "photopic average reflectance" and "reflectance" are interchangeable terms. Photopic average reflectance mimics the response of the human eye by weighting the reflectance versus wavelength spectrum according to the human eye's sensitivity. Photopic average reflectance may also be defined as the luminance, or tristimulus Y value of reflected light, according to known conventions, for example CIE color space conventions. Those with ordinary skill in the field of the disclosure can obtain or otherwise measure the "average photopic transmittance" according to these sample principles for obtaining the average photopic reflectance. The photopic average reflectance is defined in Equation (1) as the spectral reflectance, $R(\lambda)$ multiplied by the illuminant spectrum, $I(\lambda)$ and the CIE's color matching function, $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda \qquad (1)$$

As used herein, "L* brightness" is reported according to the CIE (L*, a*, b*) colorimetry system. Further, "SCI" or "SCI-L*" are interchangeable in this disclosure, and refer to the color and brightness values when the specular component of the reflected light is included in the measurement along with the non-specular or scattered component of the incident light. "SCE" and "SCE-L*" are also interchangeable terms in this disclosure, and refer to the foregoing color and brightness values, but with the specular component subtracted or otherwise removed. As such, the specular component excluded (SCE) values are considered to quantify the color and brightness of only the scattered light.

As used herein, all refractive index values reported in the disclosure are measured at a wavelength of 550 nm with a Konica-Minolta CM700d spectrophotometer, unless otherwise noted.

Embodiments of the disclosure relate to display devices and articles with color-matched display and non-display areas. These articles and display devices can be employed in various applications, including automotive interiors. Exemplary articles and display devices include a glass substrate; a display device structure that comprises a light source and a plurality of films (e.g., an organic light emitted diode device); and a black mask structure that surrounds the display device structure (e.g., a bezel). Both the display device structure and the black mask structure are coupled to the glass substrate. Further, the black mask structure comprises a black ink layer and at least one glossy layer between the black ink layer and the glass substrate. In addition, the black mask structure is configured (e.g., through the selection of the at least one glossy layer) in view of the display device structure to obtain a color-matched display area and a surrounding, black mask area.

The articles and display devices of the disclosure offer several advantages over conventional devices and related technologies. Principally, these devices can be employed in displays to achieve color-matching between the display area and surrounding, black mask area when the display associated with the device is turned off. Other approaches that merely adjust the perceived color of the black matrix material in the black mask area (e.g., to a grey hue) in an attempt to match the color of the display area usually introduce more light-scattering. Hence, conventional approaches obtain less-than-optimal color-matching between the display areas and the non-display areas of the device.

Further, as the display devices and articles of the disclosure achieve color-matching through the use of optical layers (e.g., at least one glossy layer) independent of the black matrix layers containing ink, they can achieve color-matching effects that can be applied to device constructions employing black matrix structures employing inks having different optical properties. As such, the articles and display devices of the disclosure are advantageous in the sense that they can be employed with a wide array of black matrix structures commonly employed in the field.

Another advantage of these articles and display devices of the disclosure is that they can be processed and manufactured using conventional processes for display devices or conventional processes with minor modifications. Many conventional display devices employ black ink for black matrix structures, and utilize ink-jet processing techniques for depositing these layers. The glossy layers employed in the articles and display devices of the disclosure can also be fabricated through ink jet processes. Further, the glossy layer(s) of the articles and display devices of the disclosure are configured for adhesion with other layers of the non-display portion of these articles, including but not limited to black matrix layers.

Figure 1A:
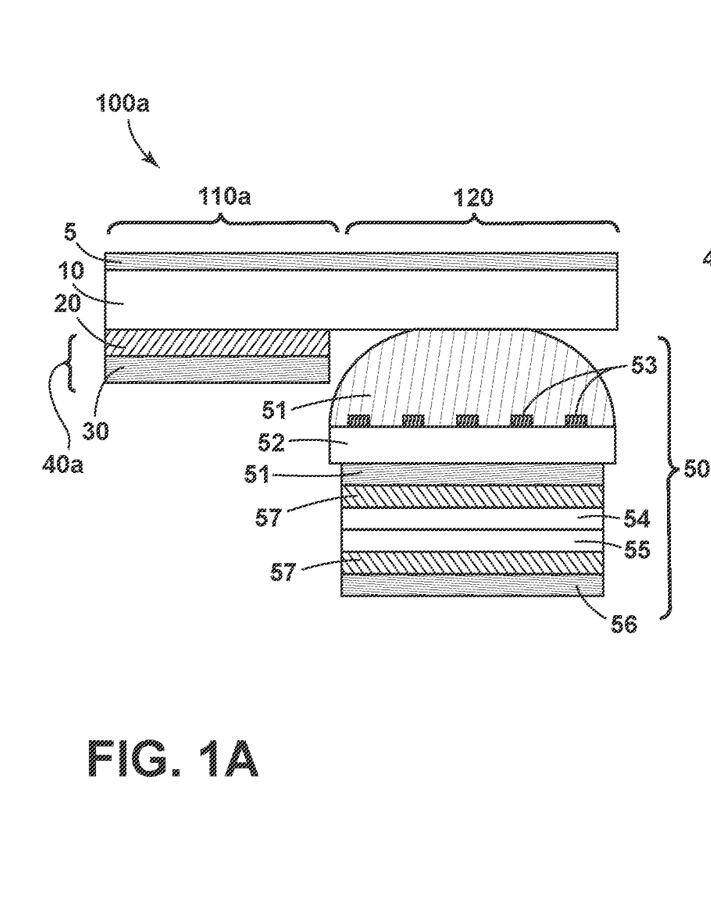
FIG. 1A is a side view of a display device, according to one or more embodiments.

Referring to FIG. 1A, a display device 100a is depicted according to one or more embodiments. The display device 100a depicted in FIG. 1A includes: a glass substrate 10, a display device structure 50 and a black mask structure 40a. The substrate 10 is further defined by a refractive index, $n_{substrate}$. In embodiments, the refractive index of the substrate 10, $n_{substrate}$, is from 1.4 to 1.6, from 1.45 to 1.55, and all refractive index values between these values. Further, the substrate 10 is coupled to each of the black mask structure 40a and the display device structure 50 to collectively define a black mask area 110a and a viewing area 120, respectively. According to some embodiments, the substrate 10 can also include one or more antireflective (AR) films 5, as shown in FIG. 1A. The AR film(s) 5 are comprised of one or more materials suitable for an AR characteristic as exhibiting an average photopic light reflectance of about 9% or less in the optical wavelength regime, e.g., the anti-reflection coatings disclosed in U.S. Patent Application Publication No. 2017/0336538, published on Nov. 23, 2017, the salient portions of which are hereby incorporated by reference in this disclosure.

As shown in FIG. 1A, the display device structure 50 of the display device 100a is shown in exemplary form as a liquid crystal display (LCD) device, as including a light source 55 and a plurality of films. The plurality of films, as shown in FIG. 1A, include an optically clear resin (OCR) layer 51 disposed over a patterned transparent conductive oxide (TCO) film 53, with the OCR layer 51 and TCO film 53 disposed on a touch screen glass substrate 52. Beneath and in contact with the glass substrate 52 are the following layers, as ordered successively: the OCR layer 51, a polarization film 57, a color filter 54, the light source 55, a polarization film 57, and a black light unit (BLU) layer 56. According to other embodiments of the display device 100a, the display device structure 50 also includes a light source 55 and a plurality of films, collectively configured as one of various conventional electronic display devices including, but not limited to, an organic light-emitting diode (OLED) device, liquid crystal (LCD) device, LED backlit LCD device, thin-film transistor (TFT) LCD device, plasma display device, quantum dot display, and active matrix organic light-emitting diode (AMOLED) device.

Referring again to FIG. 1A, the black mask structure 40a of the display device 100a includes a black ink layer 30 and at least one glossy layer 20, the glossy layer 20 (or glossy layers 20) disposed between the black ink layer 30 and the glass substrate 10. The glossy layer 20 can be further defined by a refractive index, $n_{glossy}$. In embodiments, the refractive index of the glossy layer(s) 20, $n_{glossy}$, is from 1.5 to 1.9, from 1.6 to 1.9, from 1.65 to 1.85, and all refractive index values between these values. In some embodiments of the display device 100a, the refractive indices of the glossy layer(s) 20 and the glass substrate 10 are such that the absolute value of the difference between $n_{glossy}$ and $n_{substrate}$ is greater than 0.1, greater than 0.15, greater than 0.2, and all absolute values between or greater than these differences (i.e., $|n_{glossy} - n_{substrate}| > 0.1$, 0.11, 0.12, 0.13, 0.14, 0.15, 0.16, 0.17, 0.18, 0.19, 0.2, 0.25, 0.3, etc.).

Referring again to FIG. 1A, the viewing area 120 of the display device 100a can be characterized with (a) a reflectance from 0.5% to 2.5% as measured at 8 degrees from normal in the visible spectrum, and (b) a brightness in the (L*, a*, b*) CIE colorimetry system such that $5 < L^* < 17$ for the specular component included (SCI), and (c) a brightness in the (L*, a*, b*) CIE colorimetry system such that 0<L*<3 for the specular component excluded (SCE). According to some embodiments, the viewing area 120 is characterized by a reflectance from 0.1% to 3%, from 0.5% to 2.5%, from 0.5% to 2.0%, and all reflectance levels between these levels, as measured at 8 degrees from normal in the visible spectrum. According to embodiments, the viewing area 120 is characterized by a brightness in the (L*, a*, b*) CIE colorimetry system such that 3<L*<20, 5<L*<17, or 5<L*<15, for the specular component included (SCI). According to some embodiments, the viewing area 120 is characterized by a brightness in the (L*, a*, b*) CIE colorimetry system such that 0<L*<5, 0<L*<4, or 0<L*<3, for the specular component excluded (SCE).

Still referring to FIG. 1A, the black mask area 110a of the display device 100a can be characterized with (a) a reflectance from 0.5% to 2.5% as measured at 8 degrees from normal in the visible spectrum, and (b) a brightness in the (L*, a*, b*) CIE colorimetry system such that 0<L*<20 for the specular component included (SCI), and (c) a brightness in the (L*, a*, b*) CIE colorimetry system such that 0<L*<3 for the specular component excluded (SCE). According to some embodiments, the black mask area 110a is characterized by a reflectance from 0.1% to 3%, from 0.5% to 2.5%, from 0.5% to 2.0%, and all reflectance levels between these levels, as measured at 8 degrees from normal in the visible spectrum. According to embodiments, the black mask area 110a is characterized by a brightness in the (L*, a*, b*) CIE colorimetry system such that 0<L*<20, 5<L*<20, or 5<L*<15, for the specular component included (SCI). In some implementations, black mask structure 40a can be characterized by a brightness in the (L*, a*, b*) CIE colorimetry system such that L*>8 or, more preferably, L*>12, for the specular component included (SCI). According to some embodiments, the viewing area 120 is characterized by a brightness in the (L*, a*, b*) CIE colorimetry system such that 0<L*<5, 0<L*<3, or 1<L*<3, for the specular component excluded (SCE).

Referring again to the display device 100a shown in FIG. 1, the glossy layer 20 (or layers 20) can be characterized by color in the (L*, a*, b*) CIE colorimetry system such that −1<a*, b*<+1 for the specular component excluded (SCE) according to some implementations. Further, the glossy layer 20 (or layers 20) can be characterized by color in the (L*, a*, b*) CIE colorimetry system such that −1<a*<+1 and −1.5<b*<+1, and all values of a* and b* between these values. In some embodiments, the at least one glossy layer 20 (or layers 20) can be characterized by color in the (L*, a*, b*) CIE colorimetry system such that −1<Δa*, Δb*<2 for the specular component excluded (SCE) and Δa*, Δb* is the difference in color (a*, b*) between the at least one glossy layer 20 and the black ink layer 30.

Figure 1B:
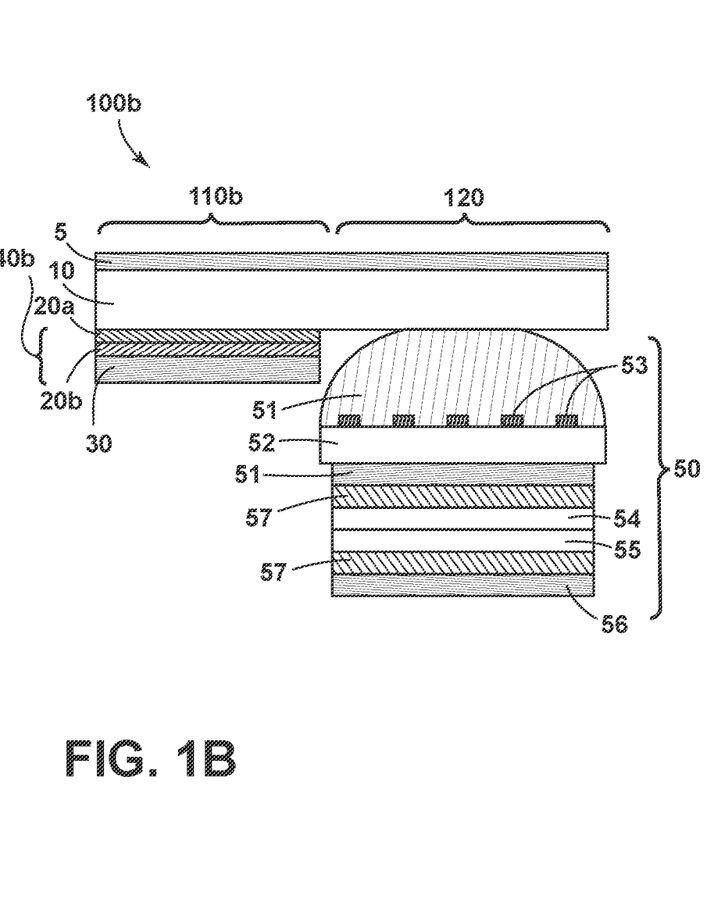
FIG. 1B is a side view of a display device, according to one or more embodiments.

Referring now to FIG. 1B, a display device 100b is depicted according to one or more embodiments. Unless otherwise noted, the display device 100b is substantially similar to the display device 100a shown in FIG. 1A, and like-number elements have the same or substantially similar structure and function. The display device 100b depicted in FIG. 1B includes: a glass substrate 10, a display device structure 50 and a black mask structure 40b. Further, the substrate 10 is coupled to each of the black mask structure 40a and the display device structure 50 to collectively define a black mask area 110b and a viewing area 120, respectively. Hence, the display device 100b shown in FIG. 1B includes a black mask structure 40b and black mask area 110b, whereas the display device 100a shown in FIG. 1A employs a black mask structure 40a and a black mask area 110a.

Notably, the black mask structure 40b of the display device 100b includes a black ink layer 30 and a pair of glossy layers, a first glossy layer 20a and a second glossy layer 20b, both disposed between the black ink layer 30 and the glass substrate 10. In general, the pair of glossy layers 20a, 20b of the display device 100b shown in FIG. 1B have the same or substantially the same configuration and structure as the at least one glossy layer 20 employed in the display device 100a shown in FIG. 1A. According to embodiments, the first glossy layer 20a and the second glossy layer 20b of the display device 100b have different refractive index values. In other embodiments, the glossy layers 20a and 20b have the same or substantially the same refractive index values.

Substrate

The substrate 10 of the display devices 100a, 100b depicted in FIGS. 1A and 1B may include a translucent substrate material, such as an inorganic oxide material. Further, the substrate 10 may include an amorphous substrate, a crystalline substrate or a combination thereof. In one or more embodiments, the substrate exhibits a refractive index in the range from about 1.45 to about 1.55, e.g., 1.45, 1.46, 1.47, 1.48, 1.49, 1.50, 1.51, 1.52, 1.53, 1.54, 1.55, and all refractive indices therebetween.

Suitable substrates 10 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. The Young's modulus values for the substrate itself as recited in this disclosure refer to values as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In one or more embodiments, the amorphous substrate may include glass, which may be strengthened or non-strengthened. Examples of suitable glass include soda lime glass, alkali aluminosilicate glass, alkali-containing borosilicate glass and alkali aluminoborosilicate glass. In some variants, the glass may be free of lithia. In one or more alternative embodiments, the substrate 10 may include crystalline substrates, for example, glass-ceramic, or ceramic, substrates (which may be strengthened or non-strengthened), or may include a single crystal structure, for example, sapphire. In one or more specific embodiments, the substrate 10 includes an amorphous base (e.g., glass) and a crystalline cladding (e.g., sapphire layer, a polycrystalline alumina layer and/or or a spinel ($MgAl_2O_4$) layer).

The substrate 10 may be substantially planar or sheet-like, although other embodiments may utilize a curved or otherwise shaped or sculpted substrate. The substrate 10 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 10 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the outer surface of the AR film 5, if present, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 10 may optionally exhibit a color, for example white, black, red, blue, green, yellow, orange, etc.

Additionally or alternatively, the physical thickness of the substrate 10 may vary along one or more of its dimensions for aesthetic and/or functional reasons. For example, the edges of the substrate 10 may be thicker as compared to more central regions of the substrate 10. The length, width and physical thickness dimensions of the substrate 10 may also vary according to the application or use of the display device 100a, 100b depicted in FIGS. 1A and 1B.

The substrate 10 may be provided using a variety of different processes. For instance, where the substrate 10 includes an amorphous substrate, for example, glass, various forming methods can include float glass processes, rolling processes, up-draw processes, and down-draw processes, for example fusion draw and slot draw.

Once formed, a substrate 10 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, for example thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps for example annealing, washing, and the like, are generally determined by the composition of the substrate and the desired compressive stress (CS), depth of compressive stress (CS) layer (or depth of layer) of the substrate that result from the strengthening operation. By way of example, ion exchange of alkali metal-containing glass substrates may be achieved by immersion in at least one molten bath containing a salt for example, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. Pat. No. 8,561,729, issued on Oct. 22, 2013 and entitled "Glass with Compressive Surface for Consumer Applications", claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, issued on Nov. 20, 2012 and entitled "Dual Stage Ion Exchange for Chemical Strengthening of Glass", claiming priority from U.S. Provisional Patent Application No. 61/084,398, filed Jul. 29, 2008, in which glass substrates are strengthened by ion exchange in a first bath diluted with an effluent ion, followed by immersion in a second bath having a smaller concentration of the effluent ion than the first bath. The contents of U.S. Pat. Nos. 8,561,729 and 8,312,739 are incorporated herein by reference in their entirety.

The degree of chemical strengthening achieved by ion exchange may be quantified based on the parameters of central tension (CT), peak CS, depth of compression (DOC, which is the point along the thickness wherein compression changes to tension), and depth of ion layer (DOL). Peak CS, which is a maximum observed compressive stress, may be measured near the surface of the substrate 10 or within the strengthened glass at various depths. A peak CS value may include the measured CS at the surface ($CS_s$) of the strengthened substrate. In other embodiments, the peak CS is measured below the surface of the strengthened substrate. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM C770-16, entitled "Standard Test Method for Measurement of Glass Stress-Optical Coefficient," the contents of which are incorporated herein by reference in their entirety. As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Maximum CT values are measured using a scattered light polariscope (SCALP) technique known in the art. Refracted near-field (RNF) method or SCALP may be used to measure (graph, depict visually, or otherwise map out) the complete stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, issued on Oct. 7, 2014 and entitled "Systems and Methods for Measuring a Profile Characteristic of a Glass Sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In some embodiments, a strengthened substrate 10 can have a peak CS of 250 MPa or greater, 300 MPa or greater, 400 MPa or greater, 450 MPa or greater, 500 MPa or greater, 550 MPa or greater, 600 MPa or greater, 650 MPa or greater, 700 MPa or greater, 750 MPa or greater, or 800 MPa or greater. The strengthened substrate may have a DOC of 10 µm or greater, 15 µm or greater, 20 µm or greater (e.g., 25 µm, 30 µm, 35 µm, 40 µm, 45 µm, 50 µm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a peak CS greater than 500 MPa, a DOC greater than 15 µm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass composition includes about 6 wt. % aluminum oxide or more. In some embodiments, the substrate includes a glass composition with one or more alkaline earth oxides, such that a content of alkaline earth oxides is about 5 wt. % or more. Suitable glass compositions, in some embodiments, further comprise at least one of $K_2O$, MgO, or CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $(Li_2O+Na_2O+K_2O)$ 20 mol. % and 0 mol. % (MgO+CaO)≤10 mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤$(Li_2O+Na_2O+K_2O)$≤18 mol. % and 2 mol. %≤(MgO+CaO)≤7 mol. %.

In some embodiments, an alkali aluminosilicate glass composition suitable for the substrate 10 comprises alumina, at least one alkali metal and, in some embodiments, greater than 50 mol. % $SiO_2$, in other embodiments 58 mol. % $SiO_2$ or more, and in still other embodiments 60 mol. % $SiO_2$ or more, wherein the ratio $(Al_2O_3+B_2O_3)/\Sigma$modifiers (i.e., sum of modifiers) is greater than 1, wherein the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$ modifiers (i.e., sum of modifiers) is greater than 1.

In some embodiments, the substrate 10 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤MgO+CaO+SrO≤8 mol. %; $(Na_2O+B_2O_3)-Al_2O_3$≤2 mol. %; 2 mol. %≤$Na_2O-Al_2O_3$≤6 mol. %; and 4 mol. % $(Na_2O+K_2O)-Al_2O_3$≤10 mol. %.

In some embodiments, the substrate 10 may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 10 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 10 may include a glass-ceramic substrate, which may be strengthened or non-strengthened. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, and/or glass-ceramics that include a predominant crystal phase including β-quartz solid solution, β-spodumene ss, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for Mg' can occur.

The substrate 10, according to one or more embodiments of the display device 100a, 100b depicted in FIGS. 1A and 1B, can have a physical thickness ranging from about 50 µm to about 5 mm. Example substrate 10 physical thicknesses range from about 50 µm to about 500 µm (e.g., 50, 100, 200, 300, 400 or 500 µm). Further example substrate 10 physical thicknesses range from about 500 µm to about 1000 µm (e.g., 500, 600, 700, 800, 900 or 1000 µm). The substrate 10 may have a physical thickness greater than about 1 mm (e.g., about 2, 3, 4, or 5 mm). In one or more specific embodiments, the substrate 10 may have a physical thickness of 2 mm or less or less than 1 mm. The substrate 10 may be acid polished or otherwise treated to remove or reduce the effect of surface flaws.

Black Mask Structure

As shown in FIGS. 1A and 1B, the black mask structure 40a and 40b of the display device 100a and 100b includes a black ink layer 30 and at least one glossy layer 20 or a pair of glossy layers 20a, 20b, respectively. As noted earlier, the at least one glossy layer 20 or a pair of glossy layers 20a, 20b is disposed between the black ink layer 30 and the glass substrate 10. With regard to the black ink layer 30, it can be any conventional black ink composition commonly employed for use as a black matrix in a conventional display device. The black inks suitable for the black ink layer 30 include, but are not limited to, carbon black-based resins and carbon black-based resins comprising one or more inorganic materials to increase light-scattering. These inorganic, light-scattering materials include, but are not limited to, $TiO_2$, $BaSO_4$, lithopone, ZnS, $Al_2O_3$ and other pigments. According to embodiments, the refractive index of the black ink layer 30, $n_{block}$, is from 1.45 to 1.65, or from 1.5 to 1.6.

Referring again to FIGS. 1A and 1B, the at least one glossy layer 20 and a pair of glossy layers 20a, 20b can, according to some embodiments of the display devices 100a, 100b, be characterized with a refractive index, $n_{glossy}$, that is higher than the refractive index of the substrate, $n_{substrate}$, e.g., $|n_{glossy}-n_{substrate}|>0.1$. According to embodiments, the at least one glossy layer 20 and a pair of glossy layers 20a, 20b employed in the display devices 100a, 100b can be characterized with a refractive index, $n_{glossy}$, from about 1.3 to 2.1, from about 1.3 to about 1.9, from about 1.55 to about 2.1, from about 1.55 to about 2.0, from about 1.55 to about 1.9, or from about 1.6 to 2.1. In some implementations, the at least one glossy layer 20 and a pair of glossy layers 20a, 20b employed in the display devices 100a, 100b can be characterized with a refractive index, $n_{glossy}$, that is greater than 1.3, greater than 1.5, greater than 1.6 or greater than 1.7. For example, the at least one glossy layer 20 and a pair of glossy layers 20a, 20b employed in the display devices 100a, 100b can be characterized with a refractive index, $n_{glossy}$, of 1.30, 1.35, 1.40, 1.45, 1.5, 1.55, 1.6, 1.7, 1.8, 1.9, 2.0, 2.1, and all refractive index values between these levels.

Still referring to FIGS. 1A and 1B, the at least one glossy layer 20 and a pair of glossy layers 20a, 20b can be derived one or more of the following: a polymer, a resin, a combination of polymers and/or resins, a polymer, resin or combination thereof further comprising inorganic nanoparticles. According to some embodiments, a polymer that can be employed for the gloss layer(s) 20, 20a, 20b, various high refractive index polymers are suitable, e.g., sulfur-containing polyimides, poly(arylene sulfide)s, phosphorous-containing high refractive index polymers, halogen-containing high refractive index polymers, polyphenylquinoxalines, polymer-inorganic hybrid materials, and organometallic high refractive index polymers. In some implementations, a resin that can be employed in the glossy layer(s) 20, 20a, 20b can be derived from a resin with high aromatic content. For example, a resin with high aromatic content can employ halogen atoms (except fluorine) and/or sulfur atoms with a high atomic refraction to produce a high refractive index resin, which develops into a polymeric material, e.g., upon curing through a thermal- or photocuring process. Packing density can also play a role in increasing the refractive index of a resin suitable for the glossy layer(s) 20, 20a, 20b. Resins with higher aromatic content could have a higher packing density than linear aliphatic resins. Heteroaromatic rings containing —C=N—C— bonds would increase the refractive index of the resin as the —C=N—C— bond has a high molar refraction of 4.10, compared to the molar refraction of 1.733 with a —C=C— bond. According to an embodiment, a polymer suitable for the glossy layer(s) 20, 20a, 20b can be derived from a monomer, such as M370 (i.e., tris(2-hydroxyethyl)isocyanurate triacrylate, with a refractive index of 1.51 as measured using an Abbe refractometer at 25° C. and 589.1 nm wavelength), having groups with high molar refraction and low dispersion, e.g., CO= groups (molar refraction=2.211, atomic dispersion=0.057) and —NC bonds (molar refraction=6.136, atomic dispersion=0.129), which can contribute to increasing its effective refractive index. According to another embodiment, a polymer suitable for the glossy layer 20, 20a, 20b can be derived from one or more resins with high aromatic content, e.g., M1192 (2-propenoic acid, [1,1'-biphenyl]-4-ylmethyl ester, with a refractive index of 1.600 as measured using an Abbe refractometer at 25° C. and 589.1 nm wavelength), and a higher packing density than linear aliphatic resins, which can contribute to increasing its effective refractive index. Another benefit of employing high-refractive index resin precursors in the glossy layer(s) 20, 20a, 20b, such as M370 and M1192, is that these resins can result in improved adhesion of the glossy layer(s) with the black ink layer 30, which, collectively, form the black matrix structure 40a, 40b. According to some implementations, the polymer employed in the glossy layer(s) 20, 20a, 20b can be formulated to facilitate co-processing with the black ink layer 30, e.g., with a viscosity in the range of 4-20 cP at 25° C. for spin coating, spray coating and inkjet printing processes, or in the range of 5-160 Pas at 25° C. for processes that require higher viscosities, including slot die coating and screen printing processes.

According to some embodiments of the display devices 100a, 100b shown in FIGS. 1A and 1B, the glossy layer 20, 20a, 20b can comprise a polymer with a plurality of inorganic nanoparticles, the nanoparticles having a refractive index, $n_{nanoparticles}>1.6$. The refractive index, $n_{glossy}$, of such a glossy layer 20, 20a, 20b comprising a polymer with a plurality of inorganic nanoparticles can be estimated using Newton's equation, given below as Equation (2):

$$n^2_{glossy}=X_{polymer}*n^2_{polymer}+X_{nanoparticle}*n^2_{nanoparticle} \qquad (2)$$

where $X_{polymer}$ and $X_{nanoparticle}$ are the respective volume fractions of the polymer and nanoparticles, respectively, and $n_{polymer}$ and $n_{nanoparticle}$ are the refractive indices of the polymer and the nanoparticles, respectively. As is evident from Equation (2), when targeting an $n_{glossy}$ value with a specific type of nanoparticle, there is a maximum limit on the loading of the nanoparticle (i.e., $X_{nanoparticle}$) to ensure a stable dispersion. Hence, it can be preferable to select a high refractive index polymeric resin for the polymer in addition to a high refractive index nanoparticle material, while balancing the final optical and mechanical performance of the glossy layer 20, 20a, 20b. In some embodiments, a functionalized capping agent (e.g., an acrylic capping agent) can be added to the nanoparticles to improve the dispersion of the nanoparticles and compatibility of the nanoparticles with typical solvents employed with the resin (e.g., propylene glycol methyl ether acetate (PGMEA), ethanolamine). Suitable nanoparticles for use in such a glossy layer(s) 20, 20a, 20b include any of the following inorganic materials as given below in Table 1.

TABLE 1

Inorganic nanoparticle materials for the glossy layer(s)

| Inorganic nanoparticles | Refractive Index, n |
| --- | --- |
| Calcium carbonate | 1.63 |
| Barium sulfate | 1.64 |
| Clay | 1.65 |
| Magnesium silicate | 1.65 |
| Aluminum oxide ($Al_2O_3$) | 1.77 |

TABLE 1-continued

Inorganic nanoparticle materials for the glossy layer(s)

| Inorganic nanoparticles | Refractive Index, n |
|---|---|
| Lithopone | 1.84 |
| Zinc oxide | 2.02 |
| Antimony oxide | 2.09-2.29 |
| Zirconia (ZrO$_2$) | 2.2 |
| Zinc sulfide | 2.37 |
| Barium titanate (BaTiO$_3$) | 2.427 |
| Titanium dioxide (TiO$_2$) | 2.55-2.8 |
| Lead sulfide (PbS) | 4.2 |
| Amorphous silicon | 4.23 |

As noted earlier, a recent trend in automotive interior display design is the use of a stylish cover glass with optical and tactile functionality for the driver, including anti-reflection (AR), anti-fingerprint and haptics. As shown in FIGS. 1A and 1B, a display structure 50 can be laminated to a glass substrate 10 using an optically clear resin (OCR) (e.g., OCR layer 51), where a black mask structure 40a, 40b defines a non-display region (e.g., black mask area 110a, 110b). The display devices of the disclosure, including display devices 100a, 100b, advantageously provide color matching between the viewing area 120 and the black mask area 110a, 110b when the display device 100a, 100b is turned off. The color of the viewing area 120 is made by spectral reflectance of visible light within the multi-layered stack of the display device structure 50, glass substrate 10, and AR film 5. Spectral reflectance is affected by layer material reflectivity and Fresnel reflection due to index mismatching at the layer interface. The internal specular reflectance (i.e., average photopic reflectance) in the display area 120 at an 8 degree viewing angle has been measured in the range of 0.5% to about 2.5% range, depending on layer materials of display device structure 50. Further, the CIE-L* brightness of the viewing area 120 and the black mask area 110a, 110b is related to the reflectance of regions based on the perception of human eye. As the reflectance of these regions increases, the observed brightness also increases. As a result, the L* value of the viewing area 120 at an 8 degree viewing angle is from about 5 to 17, in terms of the specular component included (SCI). Here, the SCI represents the color and brightness values when the specular component of the reflected light is included in the measurement along with the non-specular or scattered component of the incident light. In addition, the specular component excluded (SCE) values are considered to quantify the color and brightness of only the scattered light.

By considering both SCI and SCE values, it is possible to better quantify the perception of the color and brightness of the black mask area 110a, 110b and the viewing area 120. Because the reflected color of the display by ambient light is roughly close to black, the perception of color by an observer is mostly driven by L* rather than a*, b*. In the case of a typical viewing area 120, the BRDF (Bi-directional Reflection Distribution Function) exhibits a small scattering of light, and SCE-L* is typically less than 3. The color of the black mask area 110a, 110b is made by spectral reflectance of visible light in the black mask structure 40a, 40b, the glass substrate 10 and the AR layer 5. For color matching of the viewing area 120 and the black mask area 110a, 110b on the glass substrate 10, as including an AR layer 5, the black mask area 110a, 110b can exhibit SCI-L* brightness from about 5 to about 17 and SCE-L* brightness from about 1 to about 3. Because the typical low-reflectivity AR layer 5 exhibits an SCI-L* brightness from about 3 to 5, the black mask structure 40a, 40b should contribute SCI-L* brightness of >8, preferably >12, without any significant increase of SCE-L* brightness.

Figure 2:
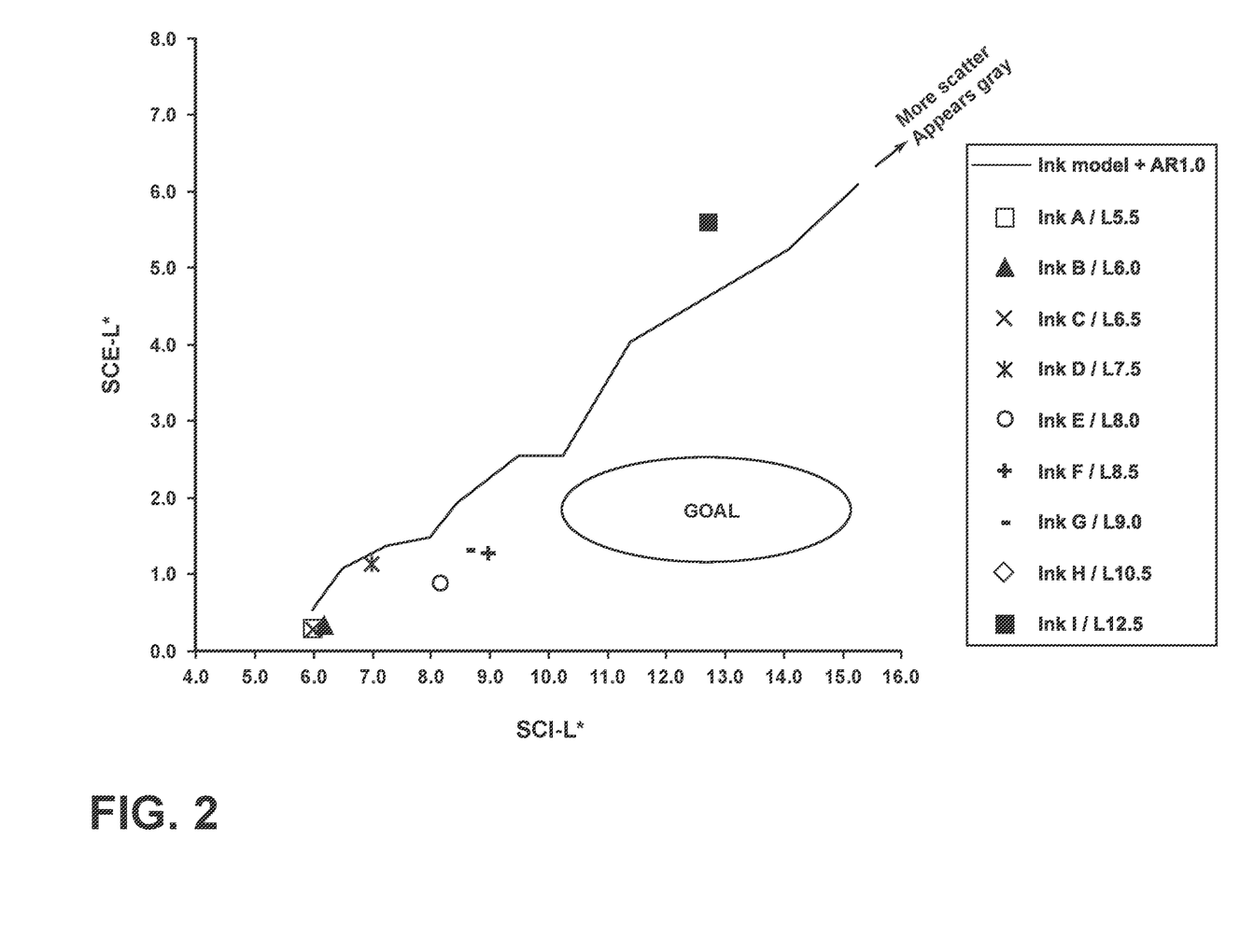
FIG. 2 is a plot of the brightness (L*) specular component excluded (SCE) vs. the brightness (L*) specular component included (SCI) for various conventional black mask structures and black mask structures, according to one or more embodiments of the disclosure.

Referring now to FIG. 2, a common technique for L* brightness control of black mask material is to increase scatter by the addition of inorganic particles such as TiO$_2$, BaSO$_4$, lithopone, ZnS, alumina, etc., in the carbon black-based resin of screen printing inks. As shown in FIG. 2, the SCE-L* and SCI-L* brightness values are plotted for a variety of conventional black mask ink compositions (i.e., Inks A-I, as denoted with varying SCI-L* brightness levels, "L5.5" to "L12.5"). As the amount of scattering material is increased (moving from Inks A to Ink I), both SCI-L* and SCE-L* brightness increase in a coupled manner, making the black ink look grey. Hence, a conventional approach to matching the color of the display area by merely adjusting the amount of scattering agents added to the black mask ink tends to change the color of the black mask to more of a grey hue, but with a high degree of light scattering which does not lend itself well to color matching. Rather, the display devices of the disclosure, including display devices 100a, 100b, are configured to meet the objective of increasing the reflectance in the black mask area 110a, 110b such that this area exhibits an SCI-L* brightness of >12, while maintaining the SCE-L* brightness at <3 (i.e., as indicated in FIG. 2 by the region labeled "Goal"). As noted earlier, embodiments of the display devices 100a, 100b achieve this objective by including at least one glossy layer 20 (e.g., as exhibiting a high refractive index, $n_{glossy}=1.71$) between the glass substrate 10 and the black ink layer 30. As reflectance scales as $(\Delta n)^2$ and assuming a refractive index of the glass substrate, $n_{substrate}$, is ~1.51, the display device 100a, 100b gains a factor of 10× in SCI-L* brightness by employing a refractive index of the at least one glossy layer 20, $n_{glossy}$ 1.59 (compared to $n_{black\ ink}=1.53$), and a factor of almost 100× by employing a refractive index of the at least one glossy layer 20, $n_{glossy}=1.71$. Put another way, the display devices of the disclosure, including display devices 100a, 100b, achieve a high SCI-L* brightness>12, while maintaining an SCE-L* brightness from about 1 to 3, by employing at least one glossy layer 20, along with a black ink layer 30 having a high SCI-L* brightness>12 and an SCE-L* brightness from about 1 to 3. An optical function of the at least one glossy layer 20 is to add Fresnel reflection by index mismatching at the interfaces of the glass substrate 10, at least one glossy layer 20 (or glossy layers 20a, 20b), and black ink layer 30.

The display devices of the disclosure, including the display devices 100a, 100b shown in FIGS. 1A and 1B, may be incorporated into a display device or used within electronic devices (e.g., consumer electronics, including mobile phones, tablets, computers, navigation systems, wearable devices and the like, augmented-reality displays, heads-up displays, glasses-based displays, architectural device articles, transportation device articles, appliance device articles, or any device article that benefits from some transparency, scratch-resistance, abrasion resistance or a combination thereof). According to some embodiments, the display devices of the disclosure may be incorporated as a 'hidden display' device article within a vehicle interior with vehicular interior systems, e.g., as an aesthetics-oriented or a dead-front display. More particularly, the display devices of the disclosure may be used in conjunction with a variety of vehicle interior systems. In one or more examples, the vehicle interior system may include a base that is an armrest, a pillar, a seat back, a floor board, a headrest, a door panel, or any portion of the interior of a vehicle that includes a surface.

EXAMPLES

Various embodiments will be further clarified by the following example, which is exemplary of the articles of the disclosure.

Example 1

According to this example, a glossy layer having an estimated refractive index, $n_{glossy}$, of about 1.750 at 589 nm was prepared (denoted "Test resin 1"). In particular, the glossy layer was prepared by developing the following mixture of constituents: (a) a 61.1% $ZrO_2$ dispersion (50 wt. % $ZrO_2$ nanoparticles in PGMEA, with $ZrO_2$ having a refractive index of 2.22 at 550 nm and 2.21 at 590 nm); (b) 8.1% M1192 resin (2-propenoic acid, [1,1'-biphenyl]-4-ylmethyl ester, CAS No. 54140-58-8, refractive index=1.600 at 589 nm); (c) 7.2% M370 resin (isocyanuric acid tris(2-acryloyloxyethyl) ester, CAS No. 40220-08-4, refractive index=1.508 at 589 nm), (d) 0.5% TPO photoinitiator (diphenyl (2,4,6-trimethylbenzoyl)phosphine oxide, CAS No. 75980-60-8); and (e) 23.1% PGMEA (CAS No. 108-65-6, refractive index=1.4 at 589 nm). A similar glossy layer (denoted "Test resin 2") was prepared using the same constituents, but without any $ZrO_2$ nanoparticles.

As noted earlier, Test resin 1 has an estimated refractive index, $n_{glossy}$, of ~1.750 at 589 nm, as measured after removal of the solvent through baking, followed by photocuring and baking steps. Test resin 2 exhibited an estimated refractive index, $n_{glossy}$, of ~1.58-1.59 at 589 nm, as measured after removal of the solvent through baking, followed by photocuring and baking steps. As shown below, Equation (2) was employed to generate the estimated refractive index values for Test resins 1 and 2 (at ~589 nm). Note that the volume fractions for each of the constituents was calculated using the above weight percentages and known density values of these constituents (e.g., $ZrO_2$ has a density of 5.68 g/cm³).

$$n_{glossy}(\text{Test resin 1}) = [(8.35/20.5) \times (1.600487)^2_{M1192} + (6.79/20.5) \times (1.50819)^2_{M370} + (5.36/20.5) \times (2.2)^2_{ZrO2\ nanoparticle}]^{0.5}$$

$$n_{glossy}(\text{Test resin 1}) = 1.75017$$

To create a thin-film glossy coating, the mixtures of this example were spin-casted onto a 4"×4" clean glass substrate (1000 RPM or 3000 RPM for 45s with acceleration of 342). The coated glass substrate was placed onto a 120° C. hotplate for 1 minute. After cooling to room temperature on a cold metal surface for 30 seconds, the film was exposed to UV light (365 nm, 320 mW/cm² for 10 seconds). A Metricon prism coupler was used to determine that the thicknesses were 1 μm (@3000 RPM spin speed) and 1.3 μm (@1000 RPM spin speed). The Metricon prism coupler also was used to determine the refractive index at several wavelengths to calculate the Sellmeier constants and to generate a dispersion curve (see FIG. 3).

Figure 3:
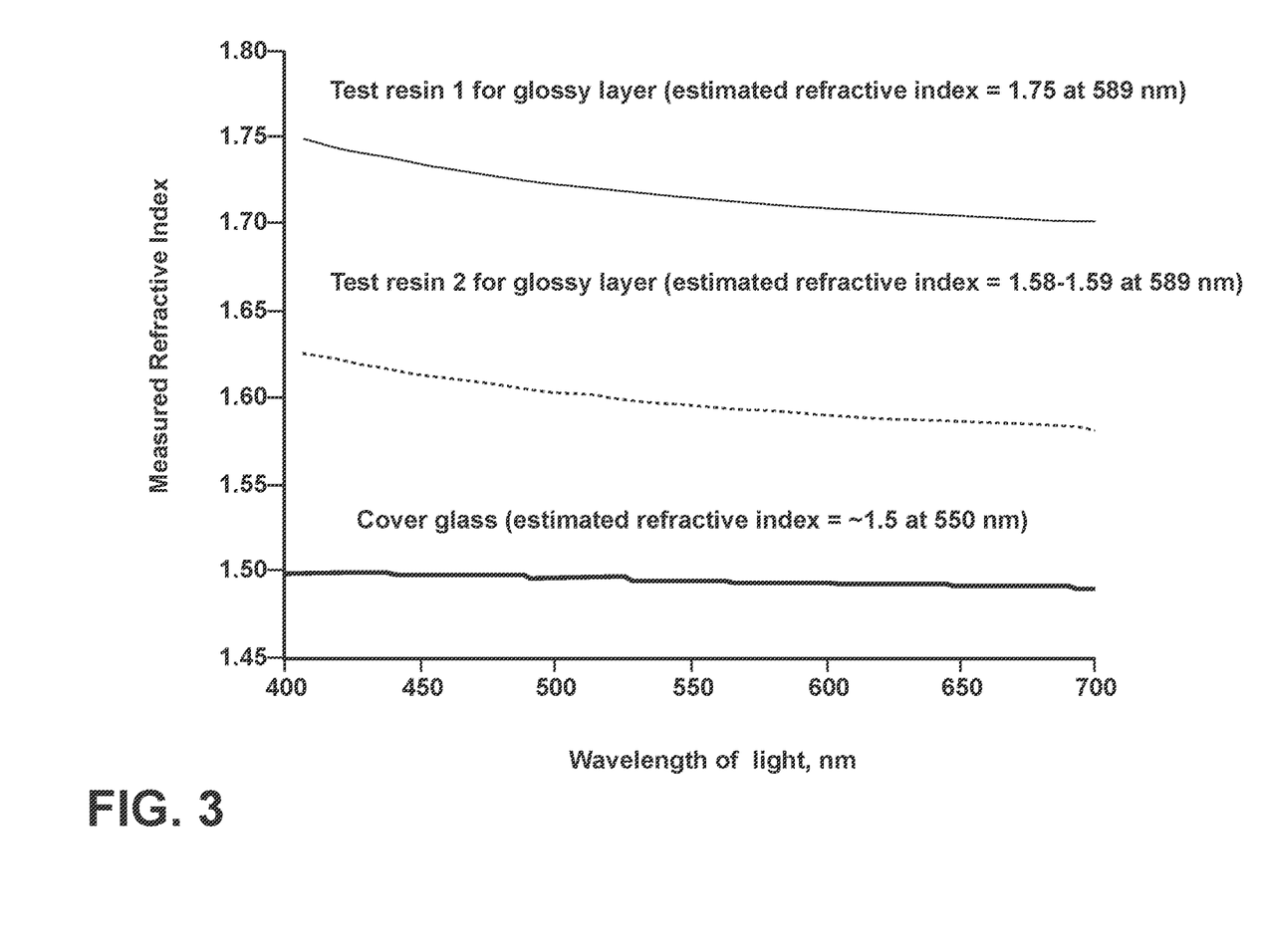
FIG. 3 is a plot of refractive index vs. wavelength (nm) for a cover glass and two glossy layers, according to one or more embodiments of the disclosure.

Referring now to FIG. 3, a plot of refractive index vs. wavelength (nm) is provided for each of a glass substrate and the two glossy layers of this example (i.e., Test resin 1 and Test resin 2). FIG. 3 identifies Test resin 1 as having an estimated refractive index of 1.750 at 589 nm, Test resin 2 as having an estimated refractive index of 1.58-1.59 at 589 nm, and the glass substrate as having an estimated refractive index of ~1.5 at 589 nm. Further, FIG. 3 shows the measured refractive index of these materials as a function of wavelength, as measured with the equipment and methods outlined above. Note that the refractive indices of the Test resin 1 and Test resin 2 are as measured after removal of the solvent through baking, followed by photocuring and baking steps.

As listed in Table 2 below, optical properties were measured on three display devices: a control sample with an AR film-coated glass substrate and a black ink layer (denoted "Control device"); a sample with an AR film-coated glass substrate, a Test resin 1 layer and a black ink layer ("Test resin 1 device"); and a sample with an AR film-coated glass substrate, a Test resin 2 layer, and a black ink layer ("Test resin 2 device"). Further, the black ink layer employed for each of these display devices is Ink I (see FIG. 2), with a brightness level of SCI-L* of 10.5 (denoted as "L10.5" in Table 2 below). As is evident from Table 2, the Test resin 1 device enables an SCI-L* brightness of 17 and an SCE-L* brightness of 1.82. Also, the Test resin 2 device enables an SCI-L* brightness of 11.34 and an SCE-L* brightness of 1.84. Conversely, the Control device only achieves an SCI-L* brightness of 10.17.

TABLE 2

Optical properties of display devices of Example 1

| Sample | Glass | Glossy resin refractive index | Ink | SCI | | | | SCE | | | |
| --- | --- | --- | --- | --- | --- | --- | --- | --- | --- | --- | --- |
| | | | | L* | a* | b* | R | L* | a* | b* | R |
| Test resin 1 | AR | 1.750 | L10.5 | 17.00 | 0.05 | −2.30 | 2.30 | 1.82 | −0.06 | −0.82 | 0.20 |
| Test resin 2 | AR | 1.58-1.59 | L10.5 | 11.34 | −0.07 | −3.82 | 1.31 | 1.84 | −0.08 | −0.84 | 0.20 |
| Control | AR | NA | L10.5 | 10.17 | −0.21 | −3.57 | 1.15 | 1.78 | −0.09 | −0.90 | 0.20 |

Figure 4:
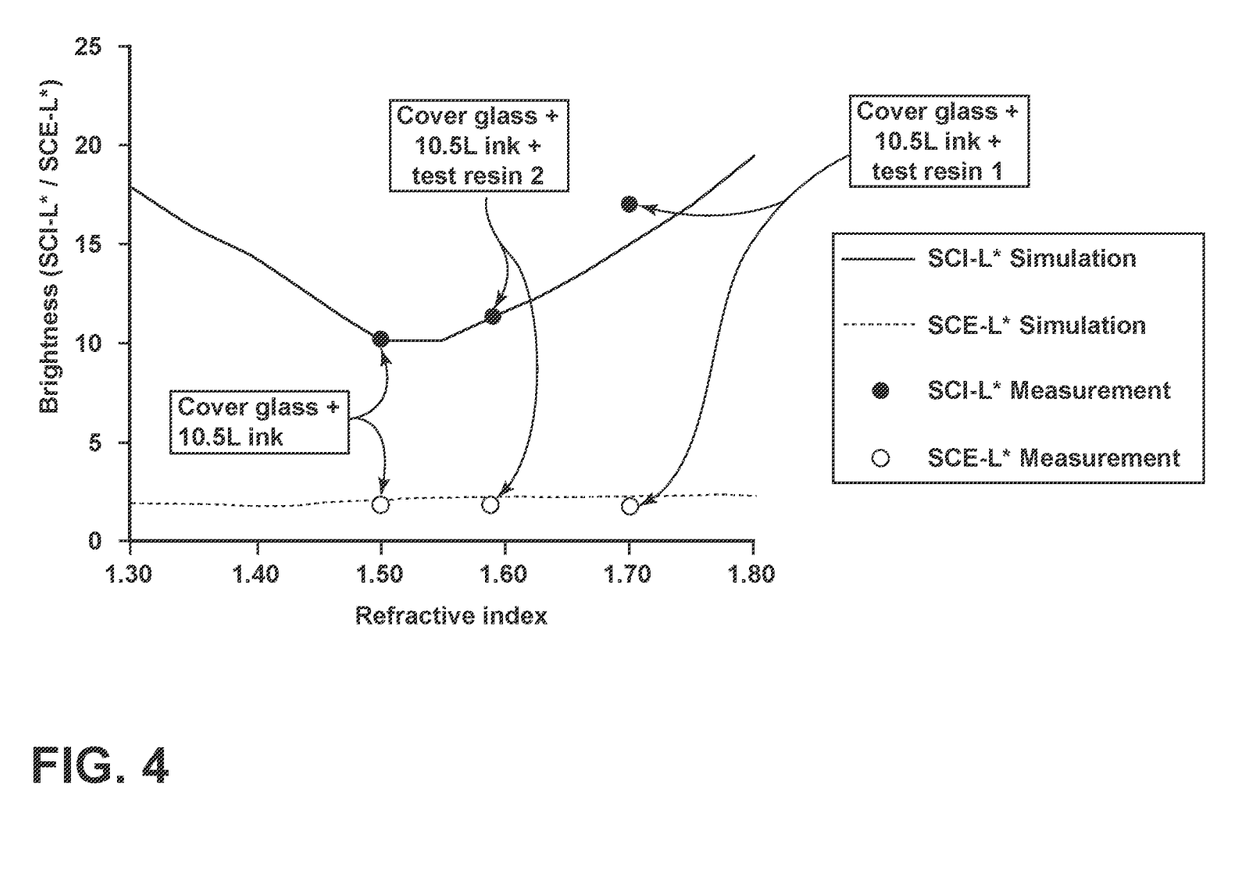
FIG. 4 is a plot of experimental and simulated brightness (SCI-L* and SCE-L*) of black mask structures employing the cover glass and glossy layers depicted in FIG. 3 vs. the refractive index of the same glossy layers and cover glass, according to one or more embodiments of the disclosure.

Referring now to FIG. 4, a plot is provided of experimental and simulated brightness (SCI-L* and SCE-L*) of black mask structures employing the glass substrate and glossy layers depicted in FIG. 3 vs. the refractive index of the same glossy layers and glass substrate. In particular, FIG. 4 shows the impact of a glossy layer on a 10.5 L black ink layer with regard to SCI-L* brightness for the case of a black mask structure comparable to the black mask structure 40a depicted in FIG. 1A. The solid lines are indicative of a simulation curve made by a ray-tracing simulation, and the three solid and open circular dots are the SCI-L* and SCE-L* measurement results associated with the samples listed above in Table 2. From the simulation curve, it is evident that index mismatching with a high index (>1.55) or a low index (<1.55) glossy resin can increase the SCI-L* brightness of the device while maintaining the same level of SCE-L* brightness. This example, and the data depicted in FIG. 4, demonstrate the goal of obtaining a significant increase in SCI-L* brightness without increasing the SCE-L* brightness. In effect, the display devices of this sample have decoupled the SCI and SCE brightness values of L*.

Example 2

Figure 5A:
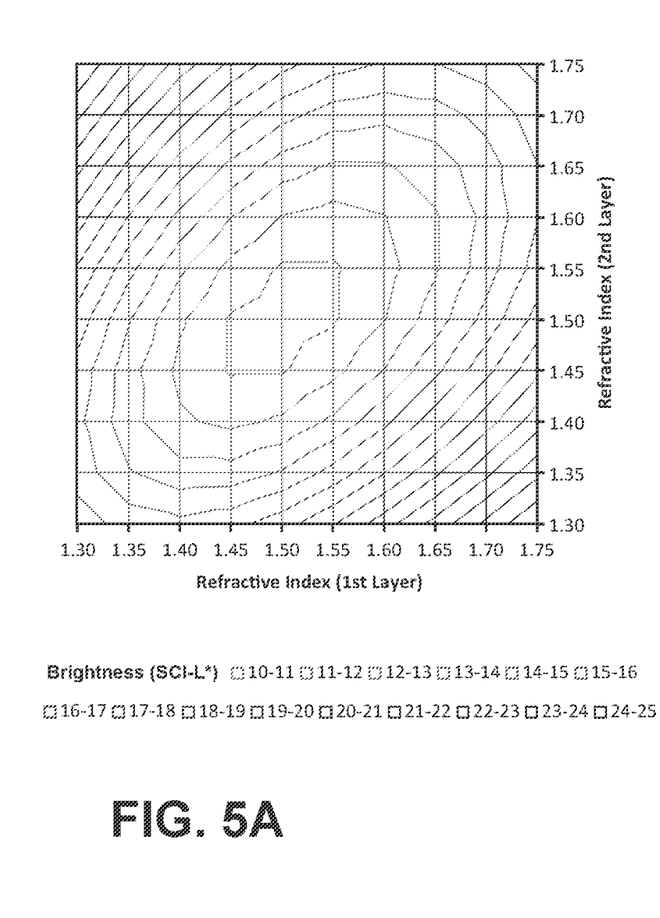
FIG. 5A is a contour plot of the simulated brightness (SCI-L*) of black mask structures employing two glossy layers having varying refractive indices and the same refractive index, a black matrix and a cover glass, according to one or more embodiments of the disclosure.
Figure 5B:
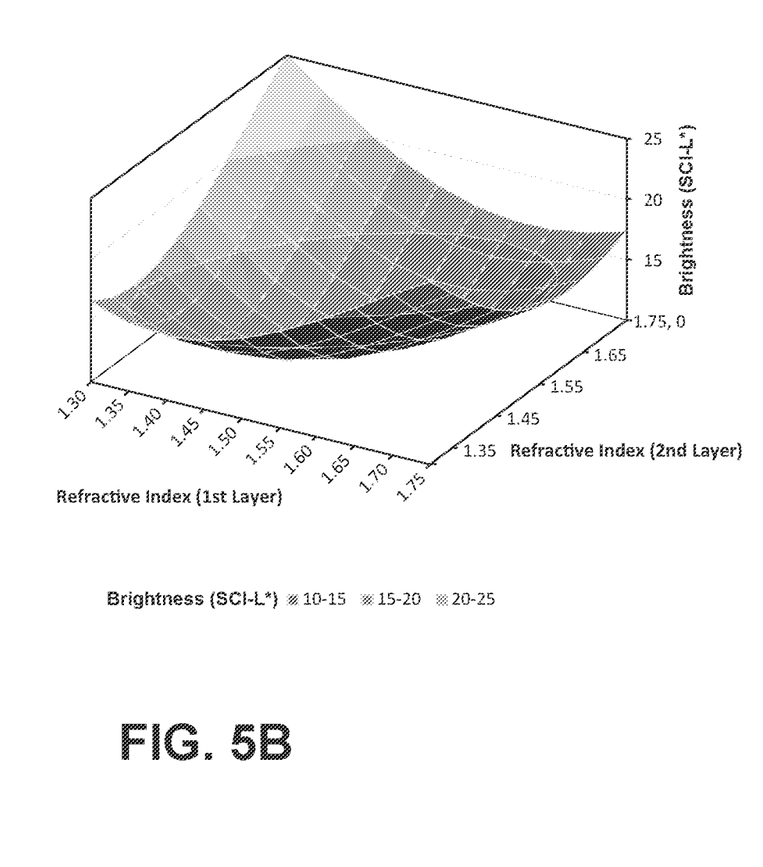
FIG. 5B is a three-dimensional surface plot of the simulated brightness (SCI-L*) of the black mask structures depicted in FIG. 5A.

In this example, SCI-L* brightness values are simulated for a variety of display device structures having black mask structures with a pair of glossy layers. Referring now to FIG. 5A, a contour plot is provided of the simulated brightness (SCI-L*) of black mask structures employing two glossy layers having varying refractive indices and the same refractive index, a black ink and a cover glass substrate. That is, FIG. 5A provides a contour plot of the simulated SCI-L* brightness of a black mask structure having two glossy layers, e.g., as comparable to a black mask structure 40b shown in FIG. 1B, in which the glossy layers have the same or varying refractive indices ranging from 1.30 to 1.75. Further, FIG. 5B is a surface plot of the same information as shown in FIG. 5A. In particular, FIG. 5B is a three-dimensional surface plot of the simulated brightness (SCI-L*) of the black mask structures depicted in FIG. 5A. Together, FIGS. 5A and 5B show that, when the two glossy resins have the same refractive index, the three-layered black mask structure (i.e., as also including a black ink layer) can be considered as a two-layered black mask structure (again, as including a black ink layer). Further, FIGS. 5A and 5B demonstrate that a three-layered black mask structure having a pair of glossy layers with differing refractive indices, e.g., as comparable to the black mask structure 40b shown in FIG. 1B, can more effectively increase SCI-L* brightness of the device in comparison to a two-layered black mask structure.

Variations and modifications may be made to the above-described embodiments of the disclosure without departing substantially from the spirit and various principles of the disclosure. All such modifications and variations are intended to be included herein within the scope of this disclosure and protected by the following claims. For example, the various features of the disclosure may be combined according to the following embodiments.

Embodiment 1. A display device, comprising:
a glass substrate comprising a refractive index ($n_{substrate}$);
a display device structure that comprises a light source and a plurality of films, the display device structure coupled to the substrate to collectively define a viewing area; and
a black mask structure surrounding the display device structure, the black mask structure coupled to the substrate,
wherein the black mask structure comprises a black ink layer and at least one glossy layer between the black ink layer and the glass substrate,
wherein the viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE), and
further wherein the at least one glossy layer comprises a refractive index ($n_{glossy}$) such that $|n_{glossy} - n_{substrate}| > 0.1$.

Embodiment 2. The display device according to Embodiment 1, wherein the refractive index of the substrate ($n_{substrate}$) is from 1.45 to 1.55 and the refractive index of the at least one glossy layer ($n_{glossy}$) is from 1.5 to 1.9.

Embodiment 3. The display device according to Embodiment 1 or Embodiment 2, wherein the at least one glossy layer comprises a refractive index ($n_{glossy}$) such that $|n_{glossy} - n_{substrate}| > 0.15$.

Embodiment 4. The display device according to any one of Embodiments 1-3, wherein the at least one glossy layer is further characterized by color in the (L*, a*, b*) CIE colorimetry system such that −1<a*, b*<+1 for the specular component excluded (SCE).

Embodiment 5. The display device according to any one of Embodiments 1-3, wherein the at least one glossy layer is further characterized by color in the (L*, a*, b*) CIE colorimetry system such that −1<Δa*, Δb*<2 for the specular component excluded (SCE) and Δa*, Δb* is the difference in color (a*, b*) between the at least one glossy layer and the black ink layer.

Embodiment 6. The display device according to any one of Embodiments 1-5, wherein the at least one glossy layer comprises a polymer and a plurality of nanoparticles comprising a refractive index ($n_{nanoparticles}$) such that $n_{nanoparticles} > 1.6$.

Embodiment 7. The display device according to any one of Embodiments 1-5, wherein the at least one glossy layer comprises a polymer comprising a refractive index ($n_{polymer}$) such that $n_{polymer} > 1.5$.

Embodiment 8. The display device according to any one of Embodiments 1-7, wherein the at least one glossy layer is a first glossy layer and a second glossy layer, each glossy layer comprising a different refractive index.

Embodiment 9. A display device, comprising:
a glass substrate comprising a refractive index ($n_{substrate}$);
a display device structure that comprises a light source and a plurality of films, the display device structure coupled to the substrate to collectively define a viewing area; and
a black mask structure surrounding the display device structure, the black mask structure coupled to the substrate to collectively define a black mask area,
wherein the black mask structure comprises a black ink layer and at least one glossy layer between the black ink layer and the glass substrate,
wherein the viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE), and
further wherein the black mask area is characterized by (a) a reflectance from 0.5% to 2.5% as measured at 8 degrees from normal in the visible spectrum, (b) a brightness in the (L*, a*, b*) CIE colorimetry system such that 0<L*<20 for the specular included component (SCI), and (c) a brightness in the (L*, a*, b*) CIE colorimetry system such that 0<L*<3 for the specular excluded component (SCE).

Embodiment 10. The display device according to Embodiment 9, wherein the refractive index of the substrate ($n_{substrate}$) is from 1.45 to 1.55 and the refractive index of the at least one glossy layer ($n_{glossy}$) is from 1.5 to 1.9.

Embodiment 11. The display device according to Embodiment 9 or Embodiment 10, wherein the black mask area is characterized by (a) a reflectance from 0.5% to 2.5% as measured at 8 degrees from normal in the visible spectrum, (b) a brightness in the (L*, a*, b*) CIE colorimetry system such that 5<L*<15 for the specular component included (SCI), and (c) a brightness in the (L*, a*, b*) CIE colorimetry system such that 1<L*<3 for the specular component excluded (SCE).

Embodiment 12. The display device according to any one of Embodiments 9-11, wherein the at least one glossy layer is further characterized by color in the (L*, a*, b*) CIE colorimetry system such that −1<a*, b*<+1 for the specular component excluded (SCE).

Embodiment 13. The display device according to any one of Embodiments 9-11, wherein the at least one glossy layer is further characterized by color in the (L*, a*, b*) CIE colorimetry system such that −1<Δa*, Δb*<2 for the specular component excluded (SCE) and Δa*, Δb* is the difference in color (a*, b*) between the at least one glossy layer and the black ink layer.

Embodiment 14. The display device according to any one of Embodiments 9-13, wherein the at least one glossy layer comprises a polymer and a plurality of nanoparticles comprising a refractive index ($n_{nanoparticles}$) such that $n_{nanoparticles}$>1.6.

Embodiment 15. The display device according to any one of Embodiments 9-13, wherein the at least one glossy layer comprises a polymer comprising a refractive index ($n_{polymer}$) such that $n_{polymer}$>1.5.

Embodiment 16. The display device according to any one of Embodiments 9-15, wherein the at least one glossy layer is a first glossy layer and a second glossy layer, each glossy layer comprising a different refractive index.

Embodiment 17. A display device, comprising:
a glass substrate comprising a refractive index ($n_{substrate}$);
a display device structure that comprises a light source and a plurality of films, the display device structure coupled to the substrate to collectively define a viewing area; and
a black mask structure surrounding the display device structure, the black mask structure coupled to the substrate to collectively define a black mask area,
wherein the black mask structure comprises a black ink layer and at least one glossy layer between the black ink layer and the glass substrate,
wherein the viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE),
wherein the black mask area is characterized by (a) a reflectance from 0.5% to 2.5% as measured at 8 degrees from normal in the visible spectrum, (b) a brightness in the (L*, a*, b*) CIE colorimetry system such that 0<L*<20 for the specular component included (SCI), and (c) a brightness in the (L*, a*, b*) CIE colorimetry system such that 0<L*<3 for the specular component excluded (SCE), and
further wherein the at least one glossy layer comprises a refractive index ($n_{glossy}$) such that $|n_{glossy}-n_{substrate}|$>0.1.

Embodiment 18. The display device according to Embodiment 17, wherein the at least one glossy layer comprises a polymer and a plurality of nanoparticles comprising a refractive index ($n_{nanoparticles}$) such that $n_{nanoparticles}$>1.6.

Embodiment 19. The display device according to Embodiment 17, wherein the at least one glossy layer comprises a polymer comprising a refractive index ($n_{polymer}$) such that $n_{polymer}$>1.5.

Embodiment 20. The display device according to any one of Embodiments 17-19, wherein the at least one glossy layer is a first glossy layer and a second glossy layer, each glossy layer comprising a different refractive index.

What is claimed is:

1. A display device, comprising:
a glass substrate comprising a refractive index ($n_{substrate}$);
a display device structure that comprises a light source and a plurality of films, the display device structure coupled to the substrate to collectively define a viewing area; and
a black mask structure surrounding the display device structure, the black mask structure coupled to the substrate,
wherein the black mask structure comprises a black ink layer and at least one glossy layer between the black ink layer and the glass substrate,
wherein the viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE), and
further wherein the at least one glossy layer comprises a refractive index ($n_{glossy}$) such that $|n_{glossy}-n_{substrate}|$>0.1.

2. The display device according to claim 1, wherein the refractive index of the substrate ($n_{substrate}$) is from 1.45 to 1.55.

3. The display device according to claim 1, wherein the at least one glossy layer comprises a refractive index ($n_{glossy}$) such that $|n_{glossy}-n_{substrate}|$>0.15.

4. The display device according to claim 1, wherein the at least one glossy layer is further characterized by color in the (L*, a*, b*) CIE colorimetry system such that −1<a*, b*<+1 for the specular component excluded (SCE).

5. The display device according to claim 1, wherein the at least one glossy layer is further characterized by color in the (L*, a*, b*) CIE colorimetry system such that −1<Δa*, Δb*<2 for the specular component excluded (SCE) and Δa*, Δb* is the difference in color (a*, b*) between the at least one glossy layer and the black ink layer.

6. The display device according to claim 1, wherein the at least one glossy layer comprises a polymer and a plurality of nanoparticles comprising a refractive index ($n_{nanoparticles}$) such that $n_{nanoparticles}$>1.6.

7. The display device according to claim 1, wherein the at least one glossy layer comprises a polymer comprising a refractive index ($n_{polymer}$) such that $n_{polymer}$>1.5.

8. The display device according to claim 1, wherein the at least one glossy layer is a first glossy layer and a second glossy layer, each glossy layer comprising a different refractive index.

9. A display device, comprising:
a glass substrate comprising a refractive index ($n_{substrate}$);
a display device structure that comprises a light source and a plurality of films, the display device structure coupled to the substrate to collectively define a viewing area; and
a black mask structure surrounding the display device structure, the black mask structure coupled to the substrate to collectively define a black mask area,
wherein the black mask structure comprises a black ink layer and at least one glossy layer between the black ink layer and the glass substrate,
wherein the viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE), and
further wherein the black mask area is characterized by (a) a reflectance from 0.5% to 2.5% as measured at 8 degrees from normal in the visible spectrum, (b) a brightness in the (L*, a*, b*) CIE colorimetry system such that 0<L*<20 for the specular included component (SCI), and (c) a brightness in the (L*, a*, b*) CIE colorimetry system such that 0<L*<3 for the specular excluded component (SCE).

10. The display device according to claim 9, wherein the refractive index of the substrate ($n_{substrate}$) is from 1.45 to 1.55 and the refractive index of the at least one glossy layer ($n_{glossy}$) is from 1.5 to 1.9.

11. The display device according to claim 9, wherein the black mask area is characterized by (a) a reflectance from 0.5% to 2.5% as measured at 8 degrees from normal in the visible spectrum, (b) a brightness in the (L*, a*, b*) CIE colorimetry system such that 5<L*<15 for the specular component included (SCI), and (c) a brightness in the (L*, a*, b*) CIE colorimetry system such that 1<L*<3 for the specular component excluded (SCE).

12. The display device according to claim 9, wherein the at least one glossy layer is further characterized by color in the (L*, a*, b*) CIE colorimetry system such that −1<a*, b*<+1 for the specular component excluded (SCE).

13. The display device according to claim 9, wherein the at least one glossy layer is further characterized by color in the (L*, a*, b*) CIE colorimetry system such that −1<Δa*, Δb*<2 for the specular component excluded (SCE) and Δa*, Δb* is the difference in color (a*, b*) between the at least one glossy layer and the black ink layer.

14. The display device according to claim 9, wherein the at least one glossy layer comprises a polymer and a plurality of nanoparticles comprising a refractive index ($n_{nanoparticles}$) such that $n_{nanoparticles}$>1.6.

15. The display device according to claim 9, wherein the at least one glossy layer comprises a polymer comprising a refractive index ($n_{polymer}$) such that $n_{polymer}$>1.5.

16. The display device according to claim 9, wherein the at least one glossy layer is a first glossy layer and a second glossy layer, each glossy layer comprising a different refractive index.

17. A display device, comprising:
a glass substrate comprising a refractive index ($n_{substrate}$);
a display device structure that comprises a light source and a plurality of films, the display device structure coupled to the substrate to collectively define a viewing area; and
a black mask structure surrounding the display device structure, the black mask structure coupled to the substrate to collectively define a black mask area,
wherein the black mask structure comprises a black ink layer and at least one glossy layer between the black ink layer and the glass substrate,
wherein the viewing area is characterized by (a) a reflectance from 0.5% to 2.5% as measured at 8 degrees from normal in the visible spectrum, (b) a brightness in the (L*, a*, b*) CIE colorimetry system such that 5<L*<17 for the specular component included (SCI), and (c) a brightness in the (L*, a*, b*) CIE colorimetry system such that 0<L*<3 for the specular component excluded (SCE),
wherein the black mask area is characterized by (a) a reflectance from 0.5% to 2.5% as measured at 8 degrees from normal in the visible spectrum, (b) a brightness in the (L*, a*, b*) CIE colorimetry system such that 0<L*<20 for the specular component included (SCI), and (c) a brightness in the (L*, a*, b*) CIE colorimetry system such that 0<L*<3 for the specular component excluded (SCE), and
further wherein the at least one glossy layer comprises a refractive index ($n_{glossy}$) such that $|n_{glossy} - N_{substrate}|$>0.1.

18. The display device according to claim 17, wherein the at least one glossy layer comprises a polymer and a plurality of nanoparticles comprising a refractive index ($n_{nanoparticles}$) such that $n_{nanoparticles}$>1.6.

19. The display device according to claim 17, wherein the at least one glossy layer comprises a polymer comprising a refractive index ($n_{polymer}$) such that $n_{polymer}$>1.5.

20. The display device according to claim 17, wherein the at least one glossy layer is a first glossy layer and a second glossy layer, each glossy layer comprising a different refractive index.

* * * * *